(12) United States Patent
Wical (10) Patent No.: US 12,277,579 B2
(45) Date of Patent: *Apr. 15, 2025

(54) SYSTEM AND METHOD PROVIDING PERSONALIZED RECOMMENDATIONS

(71) Applicant: TRANSFORM SR BRANDS LLC, Hoffman Estates, IL (US)

(72) Inventor: Kelly Joseph Wical, Monticello, IN (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/838,354

(22) Filed: Jun. 13, 2022

(65) Prior Publication Data

US 2022/0309539 A1 Sep. 29, 2022

Related U.S. Application Data

(63) Continuation of application No. 17/012,300, filed on Sep. 4, 2020, now Pat. No. 11,392,993, which is a continuation of application No. 14/660,034, filed on Mar. 17, 2015, now Pat. No. 10,769,672.

(60) Provisional application No. 62/109,877, filed on Jan. 30, 2015, provisional application No. 61/953,975, filed on Mar. 17, 2014.

(51) Int. Cl.
*G06Q 30/0251* (2023.01)

(52) U.S. Cl.
CPC ..... *G06Q 30/0269* (2013.01); *G06Q 30/0257* (2013.01)

(58) Field of Classification Search
CPC .......... G06Q 30/0269; G06Q 30/0257

USPC ............ 705/14.55, 26.1, 14.51, 14.23, 7.14; 726/1; 463/29; 706/11

See application file for complete search history.

(56) References Cited

U.S. PATENT DOCUMENTS

| 7,720,723 | B2 * | 5/2010 | Dicker ............... G06Q 30/0633 |
| | | | 705/14.51 |
| 7,925,554 | B1 | 4/2011 | Sirota |
| 9,665,874 | B2 * | 5/2017 | Chau .................. G06Q 30/0261 |
| 9,721,035 | B2 * | 8/2017 | Fink .................... G06F 16/9577 |
| 10,769,672 | B2 | 9/2020 | Wical |
| 2002/0188589 | A1 * | 12/2002 | Salmenkaita ........... G06F 21/51 |
| 2008/0215427 | A1 * | 9/2008 | Kawada ............. G06Q 30/0267 |
| | | | 705/14.51 |

(Continued)

FOREIGN PATENT DOCUMENTS

CN 101604320 A 12/2009

OTHER PUBLICATIONS

Gediminas Adomavicius, Context-Aware Recommender Systems, 2011 (Year: 2011).*

(Continued)

*Primary Examiner* — Tarek Elchanti
(74) *Attorney, Agent, or Firm* — McAndrews, Held & Malloy, Ltd.

(57) ABSTRACT

A system and method for providing personalized recommendations or promotional information to consumers based upon a recommendation algorithm selected from a number of recommendation algorithms, by matching personal contextual information of each consumer to detailed contexts in which each recommendation algorithm exhibits optimal performance with regard to particular business performance measures.

6 Claims, 7 Drawing Sheets

(56) References Cited

U.S. PATENT DOCUMENTS

| | | |
|---|---|---|
| 2009/0037975 A1* | 2/2009 | Ishikawa ............... G06F 21/105 |
| | | 726/1 |
| 2009/0281884 A1 | 11/2009 | Selinger |
| 2011/0238608 A1 | 9/2011 | Sathish |
| 2012/0150602 A1* | 6/2012 | Bennett .................. G06Q 40/03 |
| | | 705/14.23 |
| 2014/0089099 A1 | 3/2014 | Money |
| 2014/0100981 A1* | 4/2014 | Brien ................. G06Q 30/0601 |
| | | 705/26.1 |
| 2014/0180826 A1 | 6/2014 | Boal |
| 2014/0274362 A1* | 9/2014 | Dhawan ................ A63F 13/798 |
| | | 463/29 |
| 2014/0279193 A1 | 9/2014 | Westphal |
| 2014/0365255 A1* | 12/2014 | Burgess ......... G06Q 10/063112 |
| | | 705/7.14 |
| 2015/0286937 A1* | 10/2015 | Hildebrand ............. H04W 4/50 |
| | | 706/11 |

OTHER PUBLICATIONS

Xavier Amatriain, System Architectures for Personalization and Recommendation, 2013 (Year: 2013).*
Wharton School, Recommended for You: How Well Does Personalized Marketing Work, 2015 (Year: 2015).

* cited by examiner

Expanding Test Coverage

500

510 → User Action

512 → External

514 → Customer — Metrics used in performance optimization

516 → Initiative

518 → Measurements

| User Action | External | Customer | Initiative | Measurements |
|---|---|---|---|---|
| View but no click | Day of week | LTV | Content | Revenue |
| Traffic to page | Weather | LTV Trend | Marketing Segment | Margin |
| Carousel Req Result | Region | Tasterank | Message | Profit |
| Anonymous | Event/Time | Gender | Offer/Discounts | Conversions |
| Page view taxonomy | Device | Family | Asset | AOV |
| Conversion hierarchy | | Customer Interest | Tags/Rules | AOM |
| Orders over time | | Micro Segment | Vertical | AOP |
| Visits over time | | Bundle (Personal) Recommendations | Carousel and Group Recommend Type | xPerUM |
| Channel site origin | | Cold start | Campaign | xPerUC |
| Intent | | Returns, Cancels | Taxonomy | Trends |
| Channel page origin | | | Page/Position | 6 Revenue Models |
| Abandon Cart | | | Interactions | xPerView |

SYSTEM AND METHOD PROVIDING PERSONALIZED RECOMMENDATIONS

CROSS-REFERENCE TO RELATED APPLICATIONS

The present application is a continuation of U.S. patent application Ser. No. 17/012,300, filed Sep. 4, 2020, which is a continuation of U.S. patent application Ser. No. 14/660,034, filed Mar. 17, 2015 (U.S. Pat. No. 10,769,672), which makes reference to, claims benefit of, and claims priority to U.S. Provisional Patent Application No. 61/953,975, filed Mar. 17, 2014, and also makes reference to, claims benefit of, and claims priority to U.S. Provisional Patent Application No. 62/109,877, filed Jan. 30, 2015. The aforementioned documents are hereby incorporated herein by reference in their entirety.

FIELD

Aspects of the disclosure relate to systems and methods for providing product or service information to consumers. More specifically, certain aspects of the present disclosure relate to systems and methods for providing personalized recommendations or promotional information to consumers based upon a recommendation algorithm selected from a number of recommendation algorithms, by matching personal contextual information of each consumer to detailed contexts in which each recommendation algorithm exhibits optimal performance

BACKGROUND

Promotional information and product or service recommendations are directed at consumers based upon a limited amount of information about the consumer. Frequently, recommendations are made and promotional materials are selected based upon simply demographics such as household income, zipcode, age, or gender. For that reason, such recommendations and promotional information are frequently off-target and not applicable or of interest to the consumer.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and method for providing personalized recommendations or promotional information to consumers based upon a recommendation algorithm selected from a number of recommendation algorithms, by matching personal contextual information of each consumer to detailed contexts in which each recommendation algorithm exhibits optimal performance, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Aspects of the disclosure relate to systems and methods for providing product or service information to consumers. More specifically, certain aspects of the present disclosure relate to systems and methods for providing personalized recommendations or promotional information to consumers based upon a recommendation algorithm selected from a number of recommendation algorithms, by matching personal contextual information of each consumer to detailed contexts in which each recommendation algorithm exhibits optimal performance.

The following description of example methods and apparatus is not intended to limit the scope of the description to the precise form or forms detailed herein. Instead the following description is intended to be illustrative so that others may follow its teachings.

The terms "merchant" and "sponsoring merchant/merchants" may be used herein to refer to the owner and/or operator of a business enterprise that operates either or both of traditional "brick-and-mortar" business locations or an e-commerce or social e-commerce platform as described herein, or enters into an agreement with another to operate such a platform on their behalf.

The terms "customer," "consumer," "end-user," and "user" may be used herein interchangeably to refer to a potential or existing purchaser of products and/or services of a merchant or business.

The term "social network" may be used herein to refer to a network of family, friends, colleagues, and other personal contacts, or to an online community of such individuals who use a website or other technologies to communicate with each other, share information, resources, etc. The term "social graph" may be used herein to refer to a representation of the personal relationships or connections between individuals in a population.

The term "follow" may be used herein to refer to a user request to be kept informed about a particular person, place, or thing.

The term "share" may be used herein to refer to a user request to communicate information about what is being viewed by a user to members of the user's family, friends, or social network.

The term "tag" may be used herein to refer to a label (e.g., a string of characters) attached to or associated with someone or something for the purpose of identification or to give other information (e.g., characteristics of the person or thing, category to which the person or thing belongs, a relationship to other persons or things).

The term "e-commerce" may be used herein to refer to business or commerce that is transacted electronically, as over the Internet.

The term "social e-commerce" may be used herein to refer to e-commerce in which consumers interact with other consumers socially as part of e-commerce activities. Merchants or businesses may take part in social e-commerce by engaging consumers in various activities including, by way of example and not limitation, email messaging, text messaging, games, and posting or monitoring of activities and information exchanged on social networking platforms (e.g., Facebook®) and/or merchant supported social networks.

The term "crowdsourcing" may be may be used herein to refer to the practice of obtaining needed services, ideas, or content (e.g., information) by soliciting contributions from a large number of sources. The terms "crowdsource" and "crowdsource population" may be used herein to refer to a large number of sources from which contributions of services, ideas, or content may be solicited.

The term "personal contextual information" may be used herein to refer to information associated with or about an individual and their life situation including, by way of example and not limitation, name, residence location or address, residence climate, type of residence (e.g., single family home, apartment, condominium), gender, age, personal income, purchase history (e.g., at one or more merchants), credit history, credit card information, Internet activity (e.g., e-commerce and/or social e-commerce activity, page selection, page viewing, purchases, searches), social network membership and/or activity (e.g., sharing, following, tagging, friending), current geographic location, social graph, personal preferences, personal interests, personal behaviors and activities, hobbies, education, marital status, military status, and information about family members.

As utilized herein, the terms "exemplary" or "example" means serving as a non-limiting example, instance, or illustration. As utilized herein, the term "e.g." introduces a list of one or more non-limiting examples, instances, or illustrations.

The disclosed methods and systems may be part of an overall shopping experience system created to enhance the consumer shopping event. For example, the disclosed system may be integrated with the customer's reward system; the customer's social network (e.g., the customer can post their shopping activity conducted through the system to their social network); the customer's expert system; digital/mobile applications; shopping history; wish list; location; merchandise selections; product or service recommendations; personalization of advertising, promotions, and online content prepared for the consumer, or the like. However, the system disclosed may be fully and/or partially integrated with any suitable shopping system as desired, including those not mentioned and/or later designed.

Figure 1:
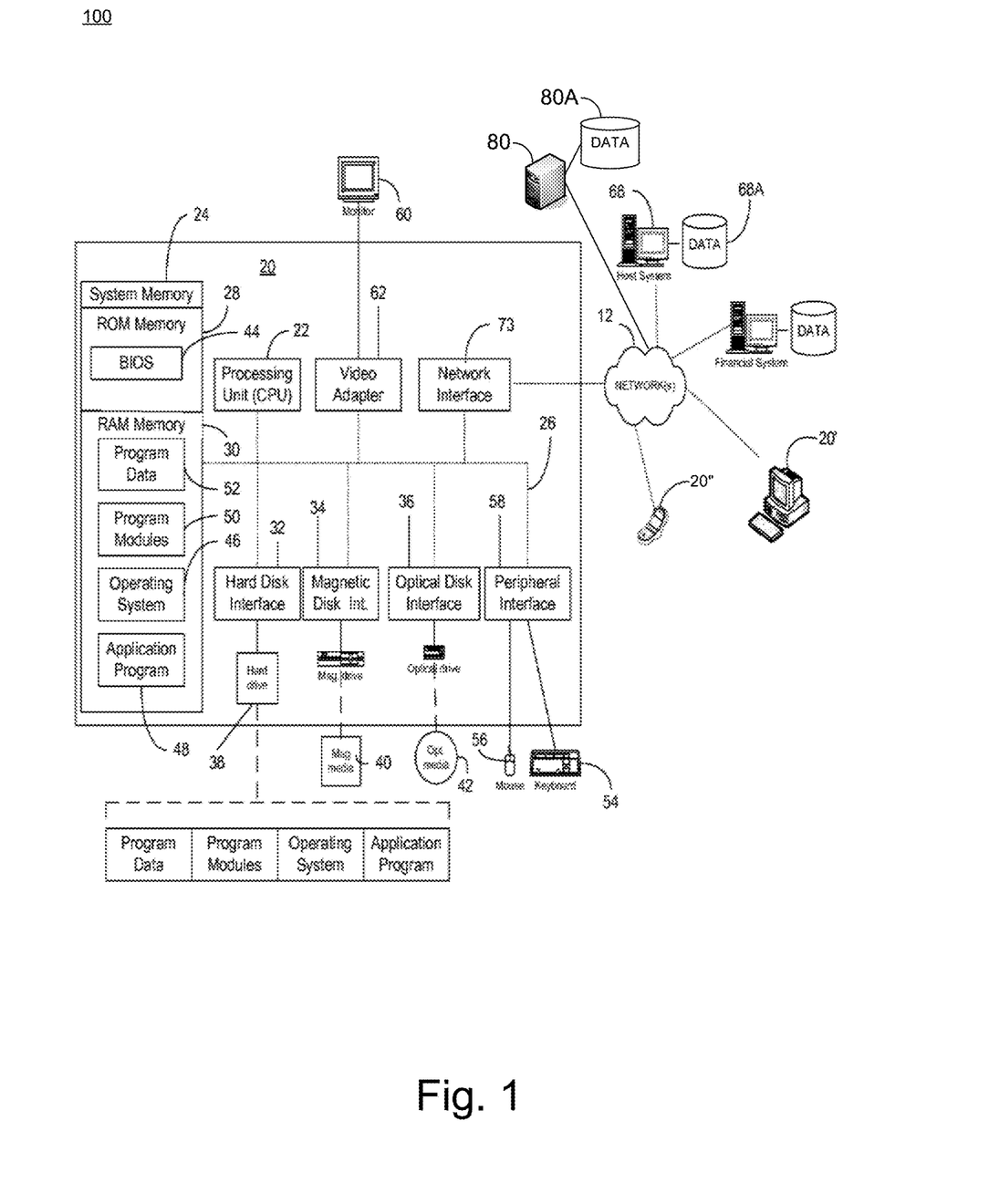
FIG. 1 is an illustration of an exemplary computer network 100 in which a representative embodiment of the present disclosure may be practiced.

FIG. 1 is an illustration of exemplary computer network 100 in which a representative embodiment of the present disclosure may be practiced. The following discloses various example systems and methods for, by way of example and not limitation, for providing personalized recommendations or promotional information to consumers based upon a recommendation algorithm selected from a number of recommendation algorithms according to personal contextual information of each consumer. Referring now to FIG. 1, a processing device 20", illustrated in the exemplary form of a mobile communication device, a processing device 20', illustrated in the exemplary form of a computer system, and a processing device 20 illustrated in schematic form, are shown. Each of these devices 20, 20', 20" are provided with executable instructions to, for example, provide a means for a customer, e.g., a user, a customer or consumer, etc., or a sales associate, a customer service agent, and/or others to access a host system 68 and, among other things, be connected to a content management system, an electronic publication system, a hosted social networking site, a user profile, a store directory, and/or a sales associate. Generally, the computer executable instructions reside in program modules which may include routines, programs, objects, components, data structures, etc. that perform particular tasks or implement particular abstract data types. Accordingly, the processing devices 20, 20', 20" illustrated in FIG. 1 may be embodied in any device having the ability to execute instructions such as, by way of example, a personal computer, mainframe computer, personal-digital assistant ("PDA"), cellular telephone, tablet computer, e-reader, smart phone, or the like. Furthermore, while described and illustrated in the context of a single processing device 20, 20', 20", the various tasks described hereinafter may be practiced in a distributed environment having multiple processing devices linked via a local or wide-area network whereby the executable instructions may be associated with and/or executed by one or more of multiple processing devices.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer-readable instructions, data structures, program modules and other data for the processing device 20. Other types of non-transitory computer-readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, etc. These and other input devices are typically connected to the processing unit 22 by means of an interface 58 which, in turn, is coupled to the bus 26. Input devices may be connected to the processor 22 using interfaces such as, for example, a parallel port, game port, FireWire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system 68 having associated data repository 68A. In this regard, while the host system 68 has been illustrated in the exemplary form of a computer, the host system 68 may, like processing device 20, be any type of device having processing capabilities. Again, the host system 68 need not be implemented as a single device but may be implemented in a manner such that the tasks performed by the host system 68 are distributed amongst a plurality of processing devices/databases located at different geographical locations and linked through a communication network. Additionally, the host system 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services (e.g., system running recommendation algorithms), systems of shipping/delivery companies, media content providers, document storage systems, etc.

For performing tasks as needed, the host system 68 may include many or all of the elements described above relative to the processing device 20. In addition, the host system 68 would generally include executable instructions for, among other things, coordinating storage and retrieval of documents; maintaining social network storage of a shopping list; receiving a location of a customer via a mobile device; maintaining maps and layouts of buildings and geographic areas; calculating directions or routes within buildings and geographic areas; searching, retrieving, and analyzing web-based content; managing operating rules and communication with user devices used by participants in a multiplayer consumer game, for receiving a request for a service call center connection from either a customer or a sales associate; routing a received request via a distributed mobile video call center; receiving questions from individuals seeking information, distributing the questions to a targeted audience, and returning suitable answers to the requestor; and providing a service call infrastructure for providing the requestor with a distributed customer service experience, and providing personalized recommendations or promotional information for consumers as described further herein.

Communications between the processing device 20 and the host system 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, program modules depicted relative to the processing device 20, or portions thereof, may be stored in the non-transitory computer-readable memory storage device(s) of the host system 68 and processing devices 20, 20' and 20".

A representative embodiment of the present disclosure may also include a computer system, such as the computer system 80 of FIG. 1. Such a computer system may have one or more processor that may be communicatively coupled to user devices for a plurality of consumers, and to data storage, such as the data repository 80A. The processor(s) and data storage of the computer system 80 may be specifically configured to process and store data, parameters, and/or executable instructions for operating a plurality of algorithms, methods, and/or formulas for producing product and/or service recommendations, where each algorithm, method, or formula has been identified as optimizing one or more particular business performance measures for particular segments of the personal contextual information of the plurality of consumers. The user devices of the plurality of consumers may be, for example, any of the processing devices 20, 20', 20" shown in FIG. 1.

A representative embodiment of the present disclosure leverages a number of available algorithms for identifying products or services most likely to be of interest to a consumer, by selecting from the available algorithms an algorithm found to provide the most relevant, accurate, and timely recommendation and personalization information, based upon a personal context for the consumer and information that identifies one or more business performance measures to be optimized by the recommendation and/or personalization.

A representative embodiment of the present disclosure allows many participants (i.e., a crowd) to submit or provide algorithms, methods, formulas, and/or recommendation and personalization data, by any method desired. A system such as the host system 68 of FIG. 1 may be used to collect or access such submissions, to test the submissions, and to incorporate the use of such submissions into a system used to produce personalized recommendations for use in interacting with consumers, based on the performance of the various algorithms, methods, formulas, and recommendation personalization data, in specific personal contexts of the consumer. In some representative embodiments of the present disclosure, the submitter or provider of each algorithm, method, formula, or recommendation and personalization data that is used by the operator of the system may, for example, be compensated based on the selection and actual use of their submitted algorithm, method, formula, and recommendation or personalization data such as, for example, any improvement in profit, revenue, and/or number of additional sales made that may be realized by a merchant sponsoring or operating the system. In this manner, some representative embodiment of the present disclosure may encourage participation by many submitters with many different algorithms, methods, formulas, and/or recommendation and personalization data.

The applicant has found that recommendations and personalization are extremely difficult to optimize using prior art techniques, and that significant revenue and/or profit may be unrealized using "average" characteristics of demographic groups when making recommendations and marketing promotions to consumers. In a representative embodiment of the present disclosure, the selection of recommendation techniques, algorithms, methods, or formulas based on personal contextual information helps to realize most if not all of the potential revenue for a merchant. A representative embodiment of the present disclosure makes use of the largest number of different techniques, algorithms, methods, or formulas as possible (i.e., a form of crowdsourcing) and employs automated techniques for selecting the best performing techniques, algorithms, method, or formulas for producing recommendations and personalization of marketing efforts targeted at consumers, to optimize a selected business performance measures by using the personal contextual information of each specific consumer.

In a representative embodiment of the present disclosure, recommendations and personalization of advertisements, and correspondence, and web page content to be delivered to a consumer may be performed in real-time, based upon the current personal contextual information of the consumer, as described above. Such personal contextual information may be updated continually based on the activities of the consumer including those that occur, by way of example and not limitation, via online (e.g., Internet) and physical (e.g., "brick-and-mortar" or merchant retail store) channels or customer interfaces.

A representative embodiment of the present disclosure may use artificial intelligence, computer learning, and/or emergent data processing techniques to select one or more recommendation algorithms that have been determined to generate personal recommendation and personalization information for a particular consumer that is optimized for one or more selected business performance measures such as, for example, margin, revenue, and/or profits, for the current context of the particular consumer, based upon personal contextual information for that particular consumer. The "personal context" of a consumer encompasses the current state of a wide variety of information elements including, by way of example and not limitation, their name, residence location or address, residence climate, type of residence (e.g., single family home, apartment, condominium), gender, age, stage in life (e.g., "single," "newlywed," "expecting," "active professional," and/or "retired") and personal income. The "personal context" may also include their online and in-store purchase history (e.g., at one or more merchants and their online channels), credit history, credit card information, and Internet activity (e.g., e-commerce and/or social e-commerce activity, page selection, page viewing, purchases, searches, browsing, and/or shopping). The "personal context" of a consumer may also include information about their social network membership and/or social networking activity (e.g., "sharing," "following," "tagging," "friending," "'like'ing," "wanting," "'have'ing"); their current geographic location; information identifying members of their social graph (e.g., family member, friends, acquaintances); their personal preferences (e.g., products, brands, styles, designers, fabrics, colors); their personal interests, hobbies, and profession; their personal behaviors and activities; their education, marital status, military status, and information about family members.

Figure 2:
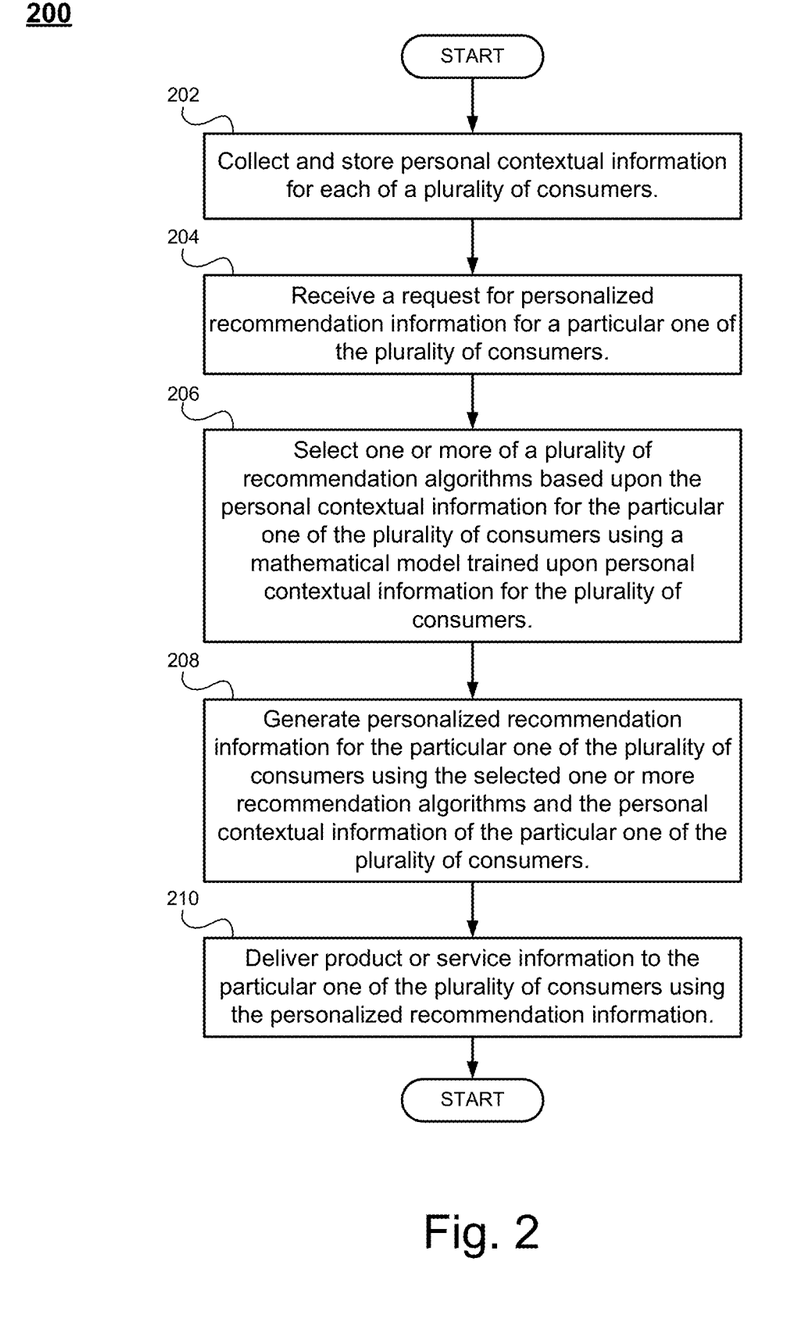
FIG. 2 illustrates a flowchart of an exemplary method for providing personalized recommendations or promotional information to consumers based upon a recommendation algorithm selected from a number of recommendation algorithms, by matching personal contextual information of each consumer to detailed contexts in which each recommendation algorithm exhibits optimal performance, in accordance with a representative embodiment of the present disclosure.

FIG. 2 illustrates a flowchart 200 of an exemplary method for providing personalized recommendations or promotional information to consumers based upon a recommendation algorithm selected from a number of recommendation algorithms, by matching personal contextual information of each consumer to detailed contexts in which each recommendation algorithm exhibits optimal performance, in accordance with a representative embodiment of the present disclosure. The actions of the method of FIG. 2 may, for example, be performed by one or more elements of a computer network such as, for example, the computer network 100 of FIG. 1.

The method of FIG. 2 begins at block 202, where a system such as, for example, the computer system 80 of FIG. 1, may collect and store personal contextual information for each of a plurality of consumers. Such personal contextual information may be the results of the various life and consumer activities, as described above. For example, in some instances, the consumer may be explicitly requested to provide certain information in requesting credit or membership in a loyalty program of a merchant, either at in-store point-of sale-locations, kiosks, or through one or more web pages of an on-line web site of the merchant. However, information may also be gathered from various interactions of the consumer with merchant systems while browsing, shopping, and/or placing orders for goods and/or services on-line. Information may also be collected during social networking, from web pages visited, and various comment and review submissions. Such data information may be continually acquired, on a real-time or near-real-time basis, and maintained in what may be referred to as "personal profile," that makes up a part of the "personal context" referred to earlier in this application. Such information and other data of such a "personal context" may be used by a representative embodiment of the disclosure as an up-to-date characterization of the consumer in selecting the most appropriate and best performing algorithm, method, or formula for providing product and/or service recommendations and personalizations that are optimized so as to produce the best possible results with respect to particular business performance measures of interest to the merchant.

Next, at block 204, a system performing the method may receive a request for personalized recommendation information for a particular one of the plurality of consumers. In some instances, such a request may originate, for example, as a result of the consumer asking to view a particular a web page. For example, the consumer may perform a search for a product or service, and fulfilling such a search request may involve generating one or more search results, which may include selecting and/or arranging the search results based on a recommendation produced using the personal context of the consumer. Such a recommendation may be made based on a desire of the merchant to optimize one or more particular business performance measures such as, by way of example and not limitation, revenue, margin, and/or profit. The request for personalized recommendation may also originate, for example, as a result of a desire on the part of a merchant to send marketing or promotional information to the consumer. For example, instead of using traditional techniques of simply selecting one or more consumers from a mailing list in the geographic area in which a promotion is to be run, and mailing the same circular to all of the selected consumer, the merchant may instead use the personal context of each consumer, and the approach of the present disclosure, to generate promotional materials (e.g., email, custom-printed brochures/advertisements for mailing, or one or more custom-tailored web pages) to be delivered to each consumer. In employing a representative embodiment of the present disclosure, the recommendations and promotions may be generated by selecting a recommendation and promotion algorithm, method, or technique that is optimized to produce the best outcome, based upon up-to-date, detailed personal contextual information of each consumer and the business performance measure of interest to the merchant.

Then, at block 206, the method may cause the system to select one or more of a plurality of available recommendation algorithms based upon the personal contextual information for the particular one of the plurality of consumers using a mathematical model based upon personal contextual information for the plurality of consumers and the specific, detailed, context in which each of the plurality of recommendation algorithms exhibit optimal performance based on any given personal context and business performance metric of interest to the merchant. In a representative embodiment of the present disclosure, the phrase "optimal performance" may by used to refer to an optimal outcome in terms of business, financial, or other goals of a merchant or business. In a representative embodiment of the present disclosure, each of the recommendation algorithms, methods, or formulas available for automatic selection may be pre-tested using a number of "test personal contexts," where each "test personal context" is a different combination of the various components of personal contextual information discussed earlier in this application (e.g., residence address, age, gender, stage of life, purchase history, etc.). Such testing may be used to determine the relative effectiveness of each recommendation algorithm, method, or technique in producing the optimal result with respect to the business performance measure(s) that may be of interest to a merchant, for a "test consumer" having the particular personal contextual information of the "test personal context." For example, such testing may segment the set of all possible consumer personal contextual information into, by way of example and not limitation, 50, 250, 500, 1000, 5000, 10000, or more "test personal contexts," for use in enabling a representative embodiment of the present disclosure to generate a recommendation optimized for the actual personal context of a particular consumer for the particular business performance measure of interest at the time that a recommendation or personalized promotion is requested.

Next, at block 208, the system may generate personalized recommendation information for the particular one of the plurality of consumers using the automatically selected recommendation algorithms, methods, or formulas and the personal contextual information of the particular one of the plurality of consumers. As described above, the resulting recommendations may take into account the current contextual information for the particular consumer, right up to the point in time at which the request for the recommendation is processed. It should be noted that, in addition, by the very nature of operation of a representative embodiment of the present disclosure, any actions of the consumer that are collected and incorporated into the personal contextual information for the particular consumer may immediately modify the algorithm, method, or technique selected for use in the generation of a subsequent recommendation. That is, the actions and interactions of a consumer with respect to a web site or mobile software application of a merchant may be gathered and used by a system in accordance with a representative embodiment of the present disclosure, in combination with other personal contextual information of the consumer, to select a recommendation algorithm, method, or formula that produces an optimized result in terms of the business performance measures of the merchant operating or sponsoring the system. It should be noted that the personal contextual information used in the selection of an algorithm, and the method, or formula for generating a recommendation may originate from sources other than the merchant from which the consumer is currently being provided a recommendation or promotional communication. For example, the personal contextual information for a consumer may be provided by other sources such as, by way of example and not limitation, public or proprietary records of home purchases, vehicle registrations, birth announcements, credit card usage, mortgage registrations, and financial and non-financial interactions with other merchants or organizations with whom the recommending merchant is in an information sharing relationship. Such information may immediately be reflected in the personal contextual information for an individual consumer, and may therefore result in an adjustment to the parameters on which subsequent recommendations are made. Further, the business performance measure for which a particular recommendation is optimized may be selected based on the source of the request for the recommendation, and/or on the source of particular elements of the personal contextual information for each consumer.

Finally, at block 210, the system performing the method of FIG. 2 may deliver the product or service recommendation or personalized marketing or promotional information to the particular one of the plurality of consumers using the personalized recommendation information generated in accordance with the present disclosure. Such delivery may be made via, for example, a web page currently being viewed by the consumer, or via a merchant software application installed on a smart phone of the consumer. When a recommendation is generated for use in promotional or marketing efforts, such recommendations may be delivered via, for example, a text message sent to the consumer via their cellular or smart phone, via promotional or other marketing content created on-the-fly, for each consumer, based on the personal contextual information for each consumer, and optimized for the business performance measure of current interest to the merchant.

As mentioned above, in a representative embodiment of the present disclosure, the various recommendation algorithms, methods, and techniques that have been tested and characterized, and made available for selection in the generation of a recommendation, may be provided by a number of different developers or vendors. The developers or vendors of such recommendation algorithms may be compensated for the use of their algorithms, methods, and formulas, according to records of algorithm selection or use in generating recommendations, which records may be maintained by the system of the present disclosure. In this manner, vendors or developers of such recommendation algorithms, method, and formulas may be compensated in accordance with how often their algorithms, methods, and formulas are actually selected or used to produce a recommendation optimized for the business performance measure of interest to the merchant operator or sponsor of the system. In this way, a representative embodiment of the present invention provides a strong incentive to the developers or vendors of such algorithms, methods, and formulas to provide the highest level of performance, so that their algorithms, methods, or formulas are most often selected, and so they therefore maximize the compensation received for their use in accordance with the present disclosure.

As described above, a representative embodiment of the present disclosure may include analysis and testing functionality that enables evaluation of various recommendation algorithms, methods, or formulas, using various sets of test personal contextual information, to determine which algorithms, methods, or formulas provide the best performance with respect to optimization of particular business performance measures for a given segmentation of the consumer personal contextual information space. The phrase "best performance" may be used herein to refer to the performance of the algorithm, method, or formula that provides the best or optimum value for a particular business performance measure, such as the examples of business performance measures provided above. The analysis and testing functionality, referred to herein as "SPAN" may, for example, perform testing of behavior of different segmentation algorithms on recommendations, and may be used to determine incremental improvements in performance due to segmentation. Such analysis may determine whether particular segmentation formulas may be used across multiple marketing activities or "campaigns," and may determine which business performance metrics are improved by particular segmentation. In addition, the analysis and testing functionality may evaluate the potential financial impact of the use of personalized recommendations according to the present disclosure, on various promotional and marketing approaches including, for example, determining the improvements in business performance measures that are provided by personalized versus non-personalized recommendations, the number or fraction of the consumer population for which personalized recommendations are able to be provided, and the impact or effect of personalized recommendations upon various business performance measures. Testing and analysis functionality of a system according to the present disclosure may also identify differences in performance of a particular recommendation made using data of various ages. That is, the analysis and testing functionality may determine the effects on performance of a particular recommendation over personalization time.

Figure 3:
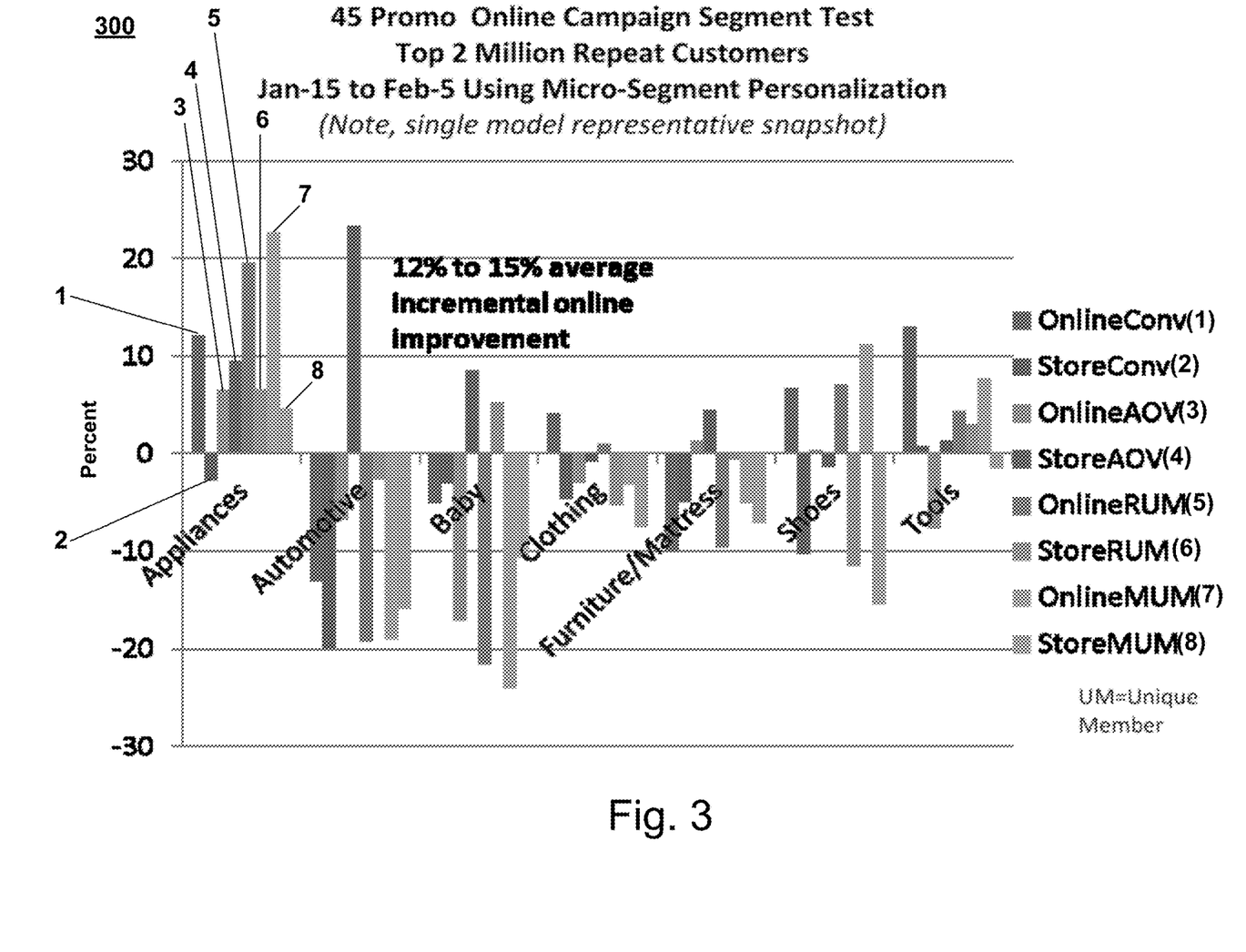
FIG. 3 is an example bar chart that illustrates the relative effect upon various business performance measures when using two different algorithms, methods, or formulas for generating recommendations to online consumers, in accordance with a representative embodiment of the present disclosure.

FIG. 3 is an example bar chart 300 that illustrates the relative effect upon various business performance measures when using two different algorithms, methods, or formulas for generating recommendations to online consumers, in accordance with a representative embodiment of the present disclosure. The illustration of FIG. 3 reveals the relative performance of a promotional campaign employing a recommendation algorithm, method, or formula selected in a manner in accordance with the present disclosure, as compared to the performance of the promotional campaign using a benchmark recommendation algorithm, method, or formula. The illustration of FIG. 3 shows that the two recommendation algorithms perform differently for various product categories (e.g., "Appliances," "Automotive," "Baby," "Clothing," "Furniture/Mattress," "Shoes," and "Tools") for the illustrated example business performance measures of number of online orders/purchases ("Online Cony (1)"), number of store purchases ("StoreConv (2)"), online average order value ("OnlineAOV (3)"), store average order value ("StoreAOV (4)"), online revenue per unique member/customer ("OnlineRUM (5)"), store revenue per unique member/customer ("StoreRUM (6)"), online margin per unique member/customer ("OnlineMUM (7)"), and store margin per unique member/customer ("StoreMUM (8)"). Thus, by using a representative embodiment of the present disclosure, selected business performance measures such as, for example, merchant orders, order value, order revenue, and/or order margin may be optimized, as desired by a merchant or an operator of the system of the present disclosure, by the appropriate and automatic choice of a best performing recommendation algorithm, method, or formula for the personal contextual information of each consumer of a population of consumers, as described above.

Figure 4:
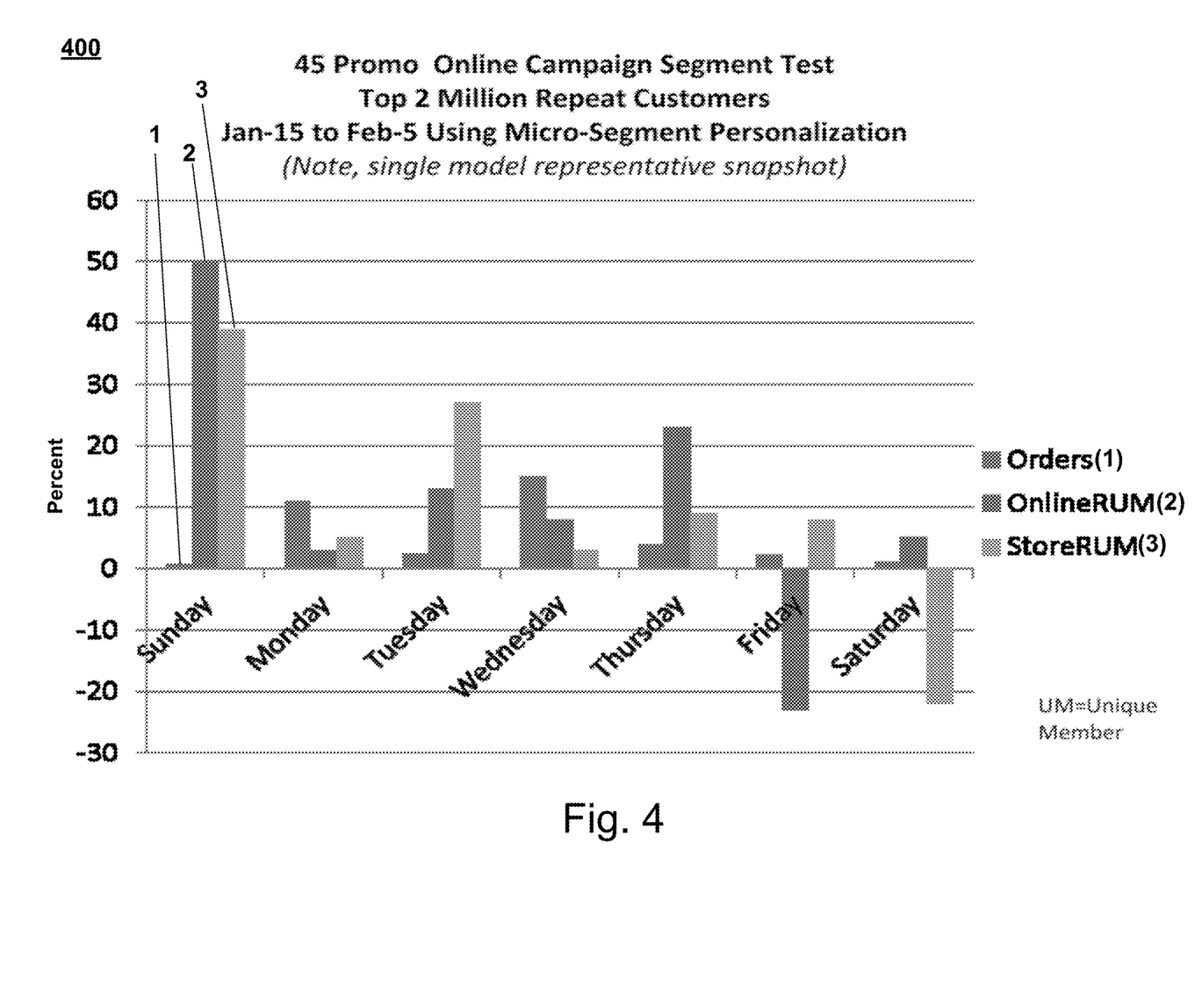
FIG. 4 is an example bar chart that illustrates the relative effect upon various business performance measures of an algorithm, method, or formula for generating recommendations to consumers for a particular product category, based upon the day of week, when using two different algorithms, methods, or formulas for generating recommendations to online consumers, in accordance with a representative embodiment of the present disclosure.

FIG. 4 is an example bar chart 400 that illustrates the relative effect upon various business performance measures of an algorithm, method, or formula for generating recommendations to consumers for a particular product category, based upon the day of week, when using two different algorithms, methods, or formulas for generating recommendations to online consumers, in accordance with a representative embodiment of the present disclosure. The illustration of FIG. 4 reveals the relative performance of a promotional campaign employing a recommendation algorithm, method, or formula selected in a manner in accordance with the present disclosure, as compared to the performance of the promotional campaign using a benchmark recommendation algorithm, method, or formula. The illustration of FIG. 4 shows that the two recommendation algorithms perform differently for the days of the week for the illustrated example business performance measures of number of online orders/purchases ("Orders (1)"), online revenue per unique member/customer ("OnlineRUM (2)"), and store revenue per unique member/customer ("StoreRUM (3)). By using a representative embodiment of the present disclosure, selected business performance measures such as, for example, those in the illustration of FIG. 4, or any other suitable business performance measures, may be optimized as desired by a merchant or an operator of the system of the present disclosure, by the appropriate and automatic choice of a best performing recommendation algorithm, method, or formula for the personal contextual information of each consumer of a population of consumers, as described above.

Figure 5:
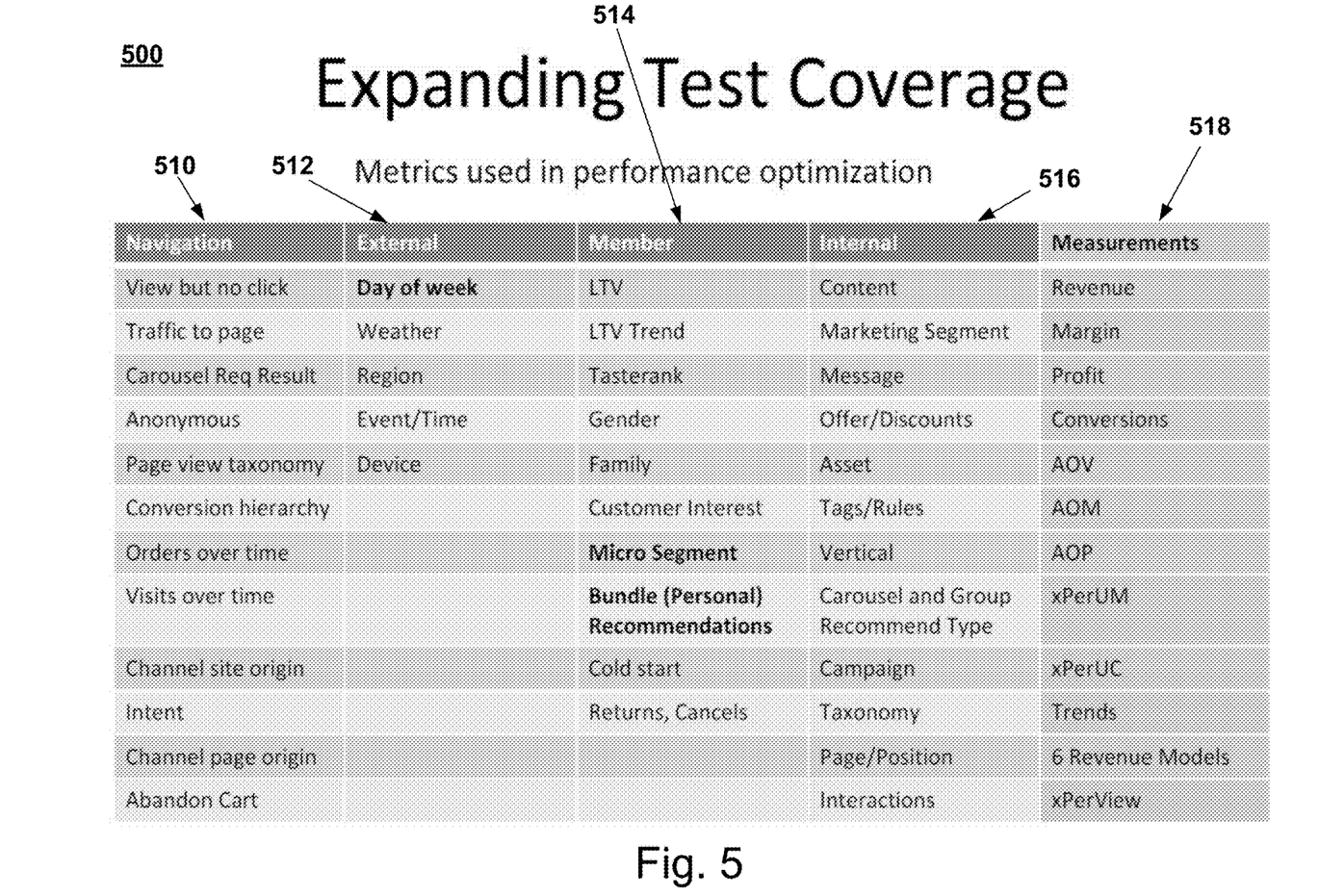
FIG. 5 illustrates a table of exemplary types of data and measurements that may be made for interactions of a consumer with a merchant, in accordance with a representative embodiment of the present disclosure.

FIG. 5 illustrates a table 500 of exemplary types of data and measurements that may be made for interactions of a consumer with a merchant, in accordance with a representative embodiment of the present disclosure. The illustration of FIG. 5 shows a number of major metrics including, by way of example and not limitation, example user interaction in an online environment metrics ("Navigation 510"), time and environmental metrics ("External 512"), consumer/member-specific metrics ("Member 514"), and various merchant-specific metrics ("Internal 516"), below which are shown various specific types of data items, the particular values of which may be continually collected for consumers during various interactions with a merchant via, by way of example and not limitation, a traditional brick-and-mortar business location, a mobile software application, or via an online point of access (e.g., web site, kiosk, or point-of-sale terminal). The right most column (i.e., "Measurements") illustrates examples, but not all possible types, of a number of different pieces of measurable data (i.e., possible business performance measures of use to a merchant) that result from merchant interactions with the consumer. These types of data items are examples, but do not represent all possible types of data, that may be included as part of the personal contextual information for each consumer, in a representative embodiment in accordance with the present disclosure.

Figure 6:
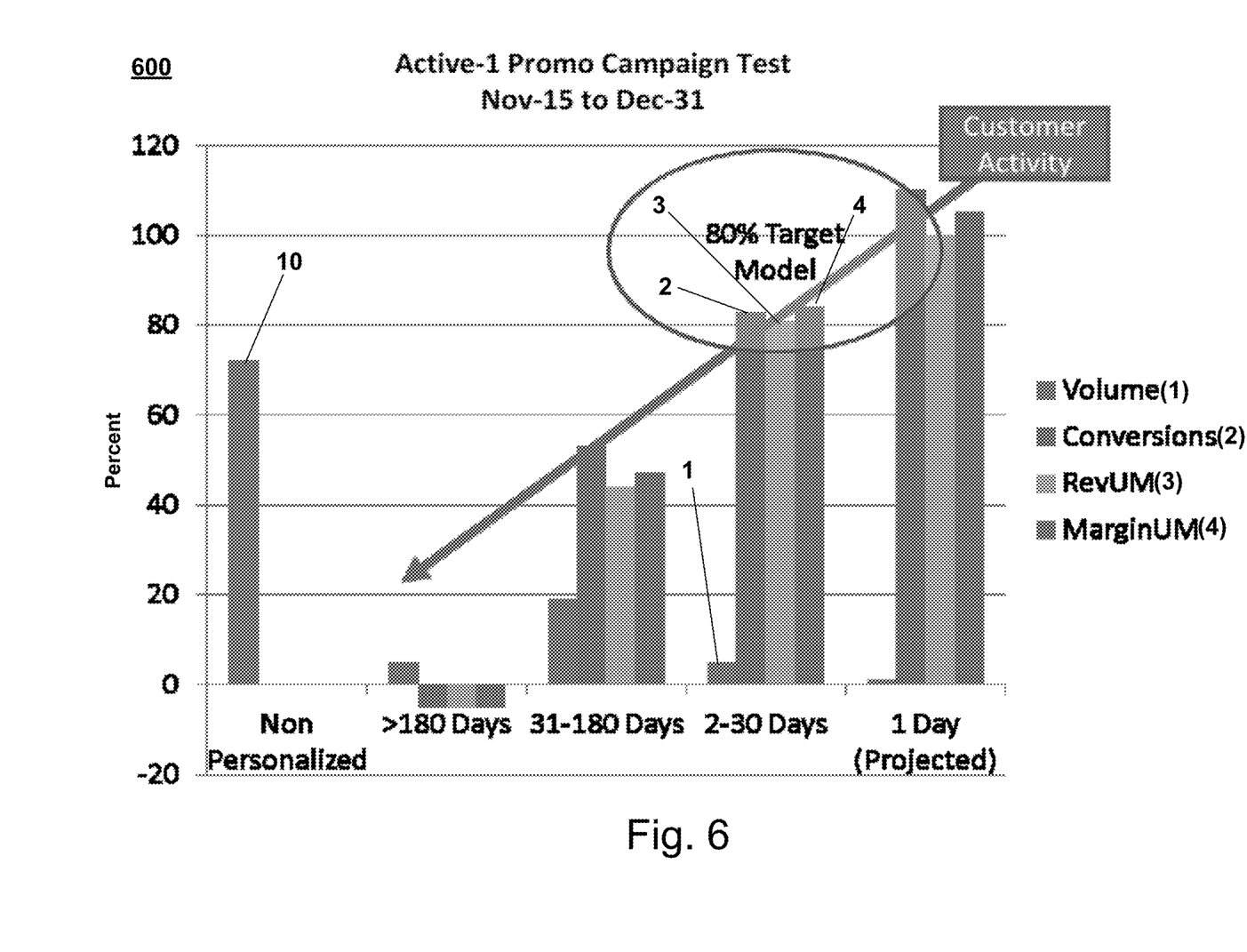
FIG. 6 is an example bar chart that illustrates the effect upon several business performance measures of non-personalized recommendations made to a group of consumers as part of a promotional activity ("campaign"), as compared to personalized recommendations to a group of consumer based upon personal contextual information of differing ages (e.g., greater than 180 days old, 31-180 days old, 2-30 days old, and one day (i.e., "real-time")), used in accordance with a representative embodiment of the present disclosure.

FIG. 6 is an example bar chart 600 that illustrates the effect upon several business performance measures of non-personalized recommendations made to a group of consumers as part of a promotional activity ("campaign"), as compared to personalized recommendations to a group of consumer based upon personal contextual information of differing ages (e.g., greater than 180 days old, 31-180 days old, 2-30 days old, and one day (i.e., "real-time")), used in accordance with a representative embodiment of the present disclosure. The example of FIG. 6 illustrates the importance of timeliness of the personal contextual information used to generate recommendations for product promotional materials delivered to consumers with respect to one or more specific products, and the resulting improvements in business performance measures of interest to a merchant including, by way of example and not limitation, "volume (1)," "conversions (2)" (i.e., sales/orders), revenue per unique member/consumer ("Revum (3)"), and margin per unique member/consumer ("MarginUM (4)".

Figure 7:
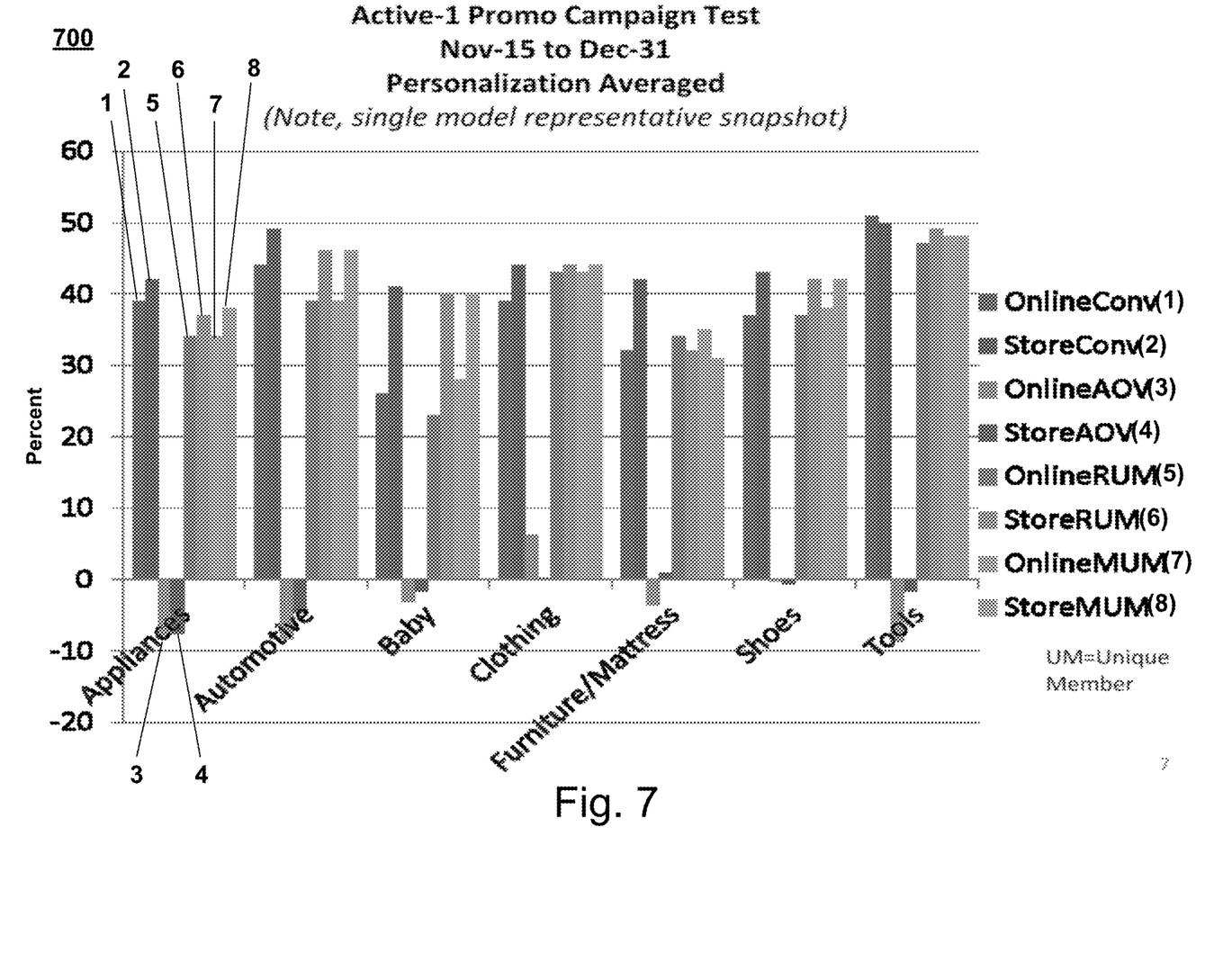
FIG. 7 illustrates an example bar graph showing the effect upon various business performance measures of personalized recommendations in various product categories used in a personalized promotional activities/campaign, in accordance with a representative embodiment of the present disclosure.

FIG. 7 illustrates an example bar graph 700 showing the effect upon various business performance measures of personalized recommendations in various product categories used in a personalized promotional activities/campaign, in accordance with a representative embodiment of the present disclosure. FIG. 7 illustrates the performance of a set of business performance measures over a number or product categories. The example of FIG. 7 includes, by way of illustration and not limitation, online sales/order ("Online-Conv (1)"), store sales/orders ("StoreConv (2)"), online average order value ("OnlineAOV (3)"), store average order value ("StoreAOV(4)"), online revenue per unique member/consumer ("OnlineRUM(5)"), store revenue per unique member/consumer ("StoreRUM(6)"), online margin per unique member/consumer ("Online MUM(7)"), and store margin per unique member/consumer ("StoreMUM(8)").

A representative embodiment of the present disclosure may select an algorithm used to generate recommendation and personalization information for a consumer, to yield optimized results for a business, merchant, or enterprise, based on financial or other performance measures in a given, specific, and highly granular context, combined with the needs or goals of the business, merchant, or enterprise. This may be achieved by determining how each of a number of algorithms performs in specific and highly granular contexts, and then matching contextual information of the consumer to a specific context, thereby identifying which algorithm(s) to use to achieve the desired optimized results with the consumer.

Aspects of the present disclosure may be seen in a method of operating a system for providing personalized recommendations or promotional information for products or services to consumers using a recommendation algorithm selected from a plurality of recommendation algorithms according to personal contextual information of each consumer. Such a method may comprise performing actions in a computer system comprising one or more processors for communicatively coupling to memory configured to store information identifying each consumer of a plurality of consumers in association with corresponding personal contextual information for each consumer of the plurality of consumers. Such actions may be in response to a request for a product or service recommendation regarding a particular consumer of the plurality of consumers, and may comprise selecting one of a plurality of recommendation algorithms optimized for a particular business performance measure, using the stored personal contextual information for the particular consumer, wherein the selection is performed using a mathematical model trained upon the personal contextual information for the plurality of consumers. Such actions may also comprise generating product or service recommendation information personalized for the particular consumer of the plurality of consumers, using the selected recommendation algorithm and the personal contextual information of the particular consumer of the plurality of consumers. The actions of the method may further comprise delivering the generated product or service recommendation information to a user device of the particular consumer of the plurality of consumers, using the personal contextual information; and updating the personal contextual information to reflect the interaction of the computer system and the particular consumer.

In accordance with a representative embodiment of the present disclosure, the request for the product or service recommendation may originate in an interaction of the particular consumer with an Internet web page, or the request for the product or service recommendation may be generated as part of production of promotional or marketing communication for the particular consumer. The personal contextual information for each consumer of the plurality of consumers may comprise personal financial data for the corresponding consumer, personal product preference data for the corresponding consumer, and data representative of non-financial interactions between the merchant and the corresponding consumer. Such a method may further comprise storing a record of use of the selected recommendation algorithm in association with information identifying a developer or supplier of the selected recommendation algorithm; and transmitting payment to the developer or supplier for use of the selected recommendation algorithm. In some representative embodiments of the present disclosure, delivering the generated product or service recommendation information to a user device of the particular consumer may comprise delivering a web page in response to a request by the particular user to the user device of the particular consumer, wherein the web page may be generated according to the product or service recommendation. In other representative embodiments of the present disclosure, delivering the generated product or service recommendation information to a user device of the particular consumer may comprises delivering a promotional communication to the user device of the particular consumer, based upon merchant selection of the particular user from the plurality of users, wherein the promotional communication is generated according to the product or service information.

Additional aspects of the present disclosure may be found in a system for providing personalized recommendations or promotional information for products or services to consumers using a recommendation algorithm selected from a plurality of recommendation algorithms according to personal contextual information of each consumer. Such a system may comprise a computer system comprising one or more processors for communicatively coupling to memory configured to store information identifying each consumer of a plurality of consumers in association with corresponding personal contextual information for each consumer of the plurality of consumers, where the one or more processors are operable to, at least, perform the actions of the method described above.

Yet other aspects of the present disclosure may be observed in a non-transitory computer-readable storage medium having a plurality of code sections, wherein each code section comprises a plurality of instructions executable by one or more processors of a computer system, the one or more processors for communicatively coupling to memory configured to store information identifying each consumer of a plurality of consumers in association with corresponding personal contextual information for each consumer of the plurality of consumers. The plurality of instructions may cause the one or more processors to perform a method of providing personalized recommendations or promotional information for products or services to consumers using a recommendation algorithm selected from a plurality of recommendation algorithms according to personal contextual information of each consumer, such as the method described above.

Although devices, methods, and systems according to the present disclosure may have been described in connection with a preferred embodiment, it is not intended to be limited to the specific form set forth herein, but on the contrary, it is intended to cover such alternative, modifications, and equivalents, as can be reasonably included within the scope of the disclosure as defined by this disclosure and appended diagrams.

Accordingly, embodiments in accordance with the present disclosure may be realized in hardware, software, or a combination of hardware and software. Embodiments in accordance with the present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Embodiments of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system comprising:
a network comprising a plurality of processing devices, wherein:
the plurality of processing devices comprises a user device of a particular consumer,
the user device is operable to provide a current geographic location of the particular consumer,
the user device is operable to distribute a plurality of executable instructions associated with and executed by one or more of the plurality of processing devices,
at least one test personal context of a plurality of test personal contexts is the current geographic location of the particular consumer,
the one or more of the plurality of processing devices is operable to:
associate a first subset of the plurality of test personal contexts with a first recommendation algorithm,
associate a second subset of the plurality of test personal contexts with a second recommendation algorithm,
dynamically select and adjust the first recommendation algorithm or the second recommendation algorithm according to real-time analysis of the particular consumer's contextual changes,
test the performance of the first recommendation algorithm and the second recommendation algorithm with respect to each test personal context of a plurality of test personal contexts, thereby optimizing the generation of recommendations, and
deliver the optimized recommendation to the user device of the particular consumer in real-time according to updated personal contextual information,
a memory of the user device is operable to:
store the first recommendation algorithm and the second recommendation algorithm for generating product or service recommendations based on personal contextual information, and
store data representing the dynamic adjustment of recommendation algorithms in response to changes in the consumer's context,
the first recommendation algorithm generates better optimized recommendations for the first subset of the plurality of test personal contexts,
the second recommendation algorithm generates better optimized recommendations for the second subset of the plurality of test personal contexts,
a relative quality of an optimized recommendation is determined according to a comparison of a plurality of business metrics and financial metrics related to user engagement and conversion rates,
a relative quality of an optimized recommendation is determined according to one or both of a business metric and a financial metric,
the one or more of the plurality of processing devices is operable to test the first recommendation algorithm and the second recommendation algorithm with respect to each test personal context of a plurality of test personal contexts,
the one or more of the plurality of processing devices is operable to deliver the optimized recommendation to the user device of the particular consumer according to personal contextual information stored in the memory,
the first recommendation algorithm is submitted by a first supplier and the second recommendation algorithm is submitted by a second supplier,
a record of use of the first recommendation algorithm is used to arrange for payment to the first supplier, and the dynamic selection and adjustment of the recommendation algorithm in response to real-time contextual changes provide a technical improvement to recommendation systems, enhancing accuracy and user satisfaction.

2. The system according to claim 1, wherein a request for a product or service recommendation originates in an interaction with an Internet web page.

3. The system according to claim 1, wherein a request for a product or service recommendation is generated as part of production of promotional or marketing communication for the user.

4. The system according to claim 1, wherein the personal contextual information comprises personal financial data for the user, personal product preference data for the user, and data representative of non-financial interactions between the merchant and the user.

5. The system according to claim 1, wherein customization of a webpage comprises:
   generation of a web page that displays a generated product or service recommendation according to one of the first recommendation algorithm and the second recommendation algorithm; and
   delivery of the web page via a network interface.

6. The system according to claim 1, wherein the one or more of the plurality of processing devices is operable to deliver a promotional communication to the user device according to a merchant selecting a particular user.

\* \* \* \* \*